United States Patent [19]

Schapira et al.

[11] Patent Number: 5,456,775
[45] Date of Patent: Oct. 10, 1995

[54] INTERNAL ADDITIVE AND PROCESS FOR THE PREPARATION OF CERTAIN CRYSTALLIZED FORMS OF AMMONIUM NITRATE AND INDUSTRIAL USES OF THE SAID FORMS

[75] Inventors: Joseph Schapira, Paris; Jean-Claude Cheminaud, Herblay; Pascal Petitbon, Franconville; Loic Guenard, Rouen; Daniel Chaillou, Sannois, all of France

[73] Assignee: CFPI, Gennevilliers, France

[21] Appl. No.: 88,645

[22] Filed: Jul. 9, 1993

[30] Foreign Application Priority Data

Feb. 24, 1993 [FR] France .................. 93 02105

[51] Int. Cl.⁶ .................. D03D 23/00; D03D 43/00
[52] U.S. Cl. .................. 149/109.6; 149/46
[58] Field of Search .................. 149/109.6, 46; 23/302 A; 71/64.02, 64.05

[56] References Cited

U.S. PATENT DOCUMENTS 3,379,496  10/1965  Russo .................. 23/103
3,388,014   5/1966  Russo .................. 149/17
3,640,697   4/1969  Toops .................. 71/27
4,111,727   9/1977  Clay .................. 149/46
5,034,071   6/1990  VanOmmeren .................. 149/46

FOREIGN PATENT DOCUMENTS

40006/85    3/1985  Australia .
2214515     1/1973  France .
2269815     4/1988  France .
82/71891   10/1980  Japan .
2175612    12/1986  United Kingdom .
WO81/01704 12/1979  WIPO .

Primary Examiner—Donald P. Walsh
Assistant Examiner—Anthony R. Chi
Attorney, Agent, or Firm—Larson & Taylor

[57] ABSTRACT

Internal additive for the preparation of prills of ammonium nitrate comprising, in aqueous solution, a mixture of at least one salt of sulphonic acid and of at least one salt of polycarboxylic acid.

14 Claims, No Drawings

INTERNAL ADDITIVE AND PROCESS FOR THE PREPARATION OF CERTAIN CRYSTALLIZED FORMS OF AMMONIUM NITRATE AND INDUSTRIAL USES OF THE SAID FORMS

The invention relates to a so-called internal additive for the preparation of certain crystallized pulverulent forms of ammonium nitrate, forms which are denoted "prills".

It also relates to the said prills as novel industrial products and to a process for their manufacture.

It finally relates to uses of the said prills especially to the manufacture of explosive compositions comprising ammoniun nitrate based emulsions.

Those uses of ammonium nitrate which are called industrial, in other words the uses of the said product in fields different from the usual field of agriculture and especially its use in the manufacture of the abovesaid explosive compositions necessitates a particular ammonium nitrate in the form of powders or hard porous prills which are called low density prills, which are free flowing, adapted to be stored during extended periods and which are the least detrimental as possible with respect to the stability of the abovesaid emulsions.

Powders based on prills of ammonium nitrate are already known.

In that connection,
  the patent WO 81/01707 of Dec. 12, 1970 discloses prills of ammonium nitrate obtained by using ammonium sulphate as internal additive;
  the patent U.S. Pat. No. 3,379,496 discloses prills of ammonium nitrate obtained using nucleation agents such as clays and which are insoluble in the molten mass of nitrate;
  the patent U.S. Pat. No. 3,388,014 discloses prills of ammonium nitrate obtained using silicates and metallic oxides;
  the patent U.S. Pat. No. 3,640,697 discloses prills of ammonium nitrate which were obtained using sodium alkylnaphthalene-sulphonates, especially those marketed by way of an additive called PETRO® AG and commercialized by PETRO CHEMICALS;
  the Applicants commercialize, especially in view of its use in the manufacture of prills of ammonium nitrate, an additive based on sodium naphthalene sulphonate called GALORYL® AT 725.

The prills obtained using these different products which are so-called internal process additives and which are supposed to permit the regulation of the evaporation of water
  either are difficult to prepare due to the difficult regulation of the process parameters,
  or fragilize, especially due to the nature of the internal additives used, the explosive emulsions for the preparation of which they are used,
  or do not present a sufficient porosity despite the fact that their hardness is convenient.

Now, taking into consideration on the one hand the always increasing requirements of the users of industrial ammonium nitrate with respect to the qualities of the prills of ammonium nitrate and, on the other hand the necessity of being able to prepare them by the most possible economical way, the Applicants have conducted studies in order to prepare an internal additive of the kind in question which copes simultaneously with all the drawbacks inherent to the use of the internal additives of the prior art.

And they have had the merit of finding that this object is reached when using as internal additive of the kind in question a mixtures comprising at least one particular salt of sulphonic acid and at least one particular salt of a polycarboxylic acid.

The above-mentioned salts of sulphonic acid comprise
  the salts of alkylbenzene sulphonic acids selected from the group comprising the salts of alkaline metals, the ammonium salts, the amine or alkanolamine salts of linear or branched mono- or polyalkyl acids, the alkyle portion of which comprises from 1 to 12 carbon atoms, preferably of toluene sulphonic acid, xylene sulphonic acid, trimethylbenzene sulphonic acid, butylbenzene sulphonic acid and dodecylbenzene sulphonic acid,
  the salts of alkylnaphthalene sulphonic acids selected from the group comprising the salts of alkaline metals, the ammonium salts, the amine or alkanolamine salts of linear or branched mono- and polyalkyle acids, the alkyle portion of which comprises from 1 to 12 carbon atoms, preferably of sulphonic acid, methyl-, dimethyl-, isopropyl-, diisopropyl-, butyl- or dibutyl-naphthalene sulphonic acid, it being possible that the naphthalene radical is not alkylated, the acid being then $\alpha$- or $\beta$-naphthalene sulphonic acid,
  the salts of aryl- or alkylaryl-sulphonic acids polymerized with formaldehyde, the said salts being alkaline metal salts, ammonium salts, amine or alkanolamine salts, aryle being benzene or naphthalene, alkyle being a linear or branched radical having from 1 to 12 carbon atoms, the preferred salts being those from $\alpha$- or $\beta$-naphthalene sulphonic acid, of methyl- or dimethyl-naphthalene sulphonic acid polycondensated with formaldehyde.

By way of consequence the internal additive according to the invention for the preparation of prills of ammonium nitrate is characterized by the fact that it comprises, in aqueous solution, a mixture
  of at least one salt of sulphonic acid comprising
    the salts of alkylbenzene sulphonic acids selected from the group comprising the salts of alkaline metals, the ammonium salts, the amine or alkanolamine salts of linear or branched mono- or polyalkyl acids, the alkyle portion of which comprises from 1 to 12 carbon atoms, preferably of toluene sulphonic acid, xylene sulphonic acid, trimethylbenzene sulphonic acid, butylbenzene sulphonic acid and dodecylbenzene sulphonic acid,
    the salts of alkylnaphthalene sulphonic acids selected from the group comprising the salts of alkaline metals, the ammonium salts, the amine or alkanolamine salts of linear or branched mono- and polyalkyle acids, the alkyle portion of which comprises from 1 to 12 carbon atoms, preferably of sulphonic acid, methyl-, dimethyl-, isopropyl-, diisopropyl-, butyl- or dibutyl-naphthalene sulphonic acid, it being possible that the naphthalene radical is not alkylated, the acid being then $\alpha$- or $\beta$-naphthalene sulphonic acid,
    the salts of aryl- or alkylaryl-sulphonic acids polymerized with formaldehyde, the said salts being alkaline metal salts, ammonium salts, amine or alkanolamine salts, aryle being benzene or naphthalene, alkyle being a linear or branched radical having from 1 to 12 carbon atoms, the preferred salts being those from $\alpha$- or $\beta$-naphthalene sulphonic acid, of methyl- or dimethyl-naphthalene sulphonic acid polycondensated with formaldehyde, and
  of at least one salt of polycarboxylic acid selected from the group comprising the alkaline metal salts, the ammonium salts, the amine or alkanolamine salts of homopolymers and/or of copolymers of ethylene carboxylic acids which result from the polymerisation of ethylenic acids of the group comprising acrylic acid, methacrylic acid, fumaric acid, maleic acid, itaconic acid, crotonic acid, aconitic acid, sinapic acid, mesaconic acid, undecylenic acid, angelic acid, hydroxyacrylic acid and maleic anhydride.

According to an advantageous embodiment of the internal additive according to the invention, the polycarboxylic acid which is part of its constitution has a molecular weight of 500 to 15000.

According to another advantageous embodiment of the internal additive according to the invention, the latter comprises from 10 to 90%, preferably from 20 to 80% and, more preferably again, from 30 to 70% expressed in dry matter of at least one salt of sulphonic acid and from 90 to 10%, preferably from 80 to 20% and, more preferably again, from 70 to 30% expressed in dry matter of at least one salt of polycarboxylic acid.

Avantageously the internal additive according to the invention is in the form of an aqueous solution whose concentration in the mixture of salt of sulphonic acid and of salt of polycarboxylic acid is from 20 to 50% expressed in dry matter.

The process according to the invention for the manufacture of the prills of ammonium nitrate is characterized by the fact that there is formed an intimate mixture of a melted solution of ammonium nitrate whose concentration is from 94 to 99% of dry matter and whose temperature is from 140° to 170° C., preferably close to 160° C., with the aqueous solution of the mixture which constitutes the internal additive according to the invention in an amount which is such that it constitutes, with respect to the dry matter of ammonium nitrate, a proportion from 0.005 to 0.12%, preferably from 0.01 to 0.08% and, still more preferably, from 0.03 to 0.08% expressed in dry matter of the said mixture, the thus constituted intimate mixture being then transformed in grains or prills using advantageously a prilling tower or a granulating drum.

It is also possible, according to the process of the invention, to form an intimate mixture of the abovesaid melted solution of ammonium nitrate with the components of the mixture which constitutes the internal additive and which are introduced separately from one another in the form of two aqueous solutions, the final proportions being unchanged.

The thus obtained grains or prills which are at a high temperature of about 100° C. and which have too important humidity of about 2 to 3%, must consequently be subjected to a sequence of drying-cooling cycles using for example drying drums, cooling devices or fluidized beds.

They can then be passed trough a sieve, in order to eliminate the particles which are too small and the particles which are too large.

At that stage, they have acquired almost the totality of their final features, i.e. a residual humidity of about 0.05% and a temperature of about 30° C.

At that stage, their porosity and their hardness are measured.

Then they are subjected to an anticlumping treatment.

The anticlumping treatment can be carried out by pulverization of an anticlumping agent on the grains or prills which are at that moment on a transportation belt or, preferably inside a coating drum.

The anticlumping treatment is of essential importance to obtain a commercial product; this is due to the fact that the clumping phenomena may induce the deterioration of the porosity of the prill, lead to its degranulation and render it unusable.

Among the anticlumping products which may be selected there are:

aqueous products, as for example the alkylarylsulphonates among which especially the one which is commercialized under the trademark PETRO® AG by the Company WITCO/DE SOTO or the one which is commercialized under the trademark GALORYL® AT 4045 by the Company LOBECO PRODUCTS Inc. in Beaufort (U.S.A.), oily products, as for example fatty amines and their organic salts among which especially the one which is commercialized under the trademark LILAMIN® AC 59 L by the Company BEROL NOBEL or those which are commercialized under the trademark GALORYL® ATH, especially GALORYL® ATH 626 M by the Applicants.

Since a few years, the tendency of the manufacturers of ammonium nitrate is to substitute the aqueous products with oily products whose performances are higher.

The prills or grains comprising the internal additives according to the invention present the qualities of hardness and of capability of free flowing which are necessary to make them storable during prolonged periods; their porosity corresponds to the porosity which must be presented by prills of ammonium nitrate intended to the manufacture of explosive compositions and the internal additives which have been incorporated therein have only a very low destabilizing influence—this destabilizing influence being in any case lower than that of the internal additives comprises by the prills of the prior art—on the emulsions water in oil which are based on ammonium nitrate and which constitute a part of the said explosive compositions which comprise both the said emulsions and the said prills.

More precisely, the prills or grains obtained using the internal additives according to the invention have a hardness higher than 0.2 kg measured with a durometer CHATILLON DFI 10 marketed by the Company INDELCO, the measurement being carried out on a granulometric fraction comprised between 1.5 and 1.6 mm (the value of the hardness is the average value of 30 grains), have a porosity higher than 5% measured by way of a test according to the standard U 42-800 and exert on emulsions water in oil based on ammonium nitrate only a very low destabilizing action, said action being in any case clearly lower than the action of the prills obtained using the internal additives according to the prior art.

Porosity is necessary for the use of the prills or grains as explosives; due to the existence of the pores, the prill is able to absorb a certain amount of fuel which is generally consisting of fuel-oil, the ammonium nitrate playing the role of oxygen provider.

Considering the fuel-oil as presenting a statistic chemical composition represented by the formula $C_6H_{12}$, the stoechiometric chemical reaction with ammonium nitrate can be as follows:

$$18NH_4NO_3 + C_6H_{12} \rightarrow 18N_2 + 6CO_2 + 42H_2O + \text{energy release.}$$

Starting from this reaction, it is possible to determine that the absorption of fuel which is theoretically necessary is equal to 5.8% weight/weight, the hypothesis being that the combustion is perfect, which in reality is not the case.

It is also possible to use the said prills to prepare explosive emulsions water in oil based on ammonium nitrate.

In that connection, the prills or grains obtained according to the process of the invention and which comprise the internal additive according to the invention, are dissolved in hot water having a temperature of about 80°–85° C., the thus formed solution which constitutes the aqueous phase being introduced, within a mixing device, in an oily phase previously additioned with emulsifying agents and heated to a temperature close to that of the aqueous phase, stirring being maintained during a sufficient time, generally from 1 to 5 minutes, to obtain the expected emulsions water in oil, the proportions by weight of the components of the emulsion with respect to the weight of the emulsion being from 40 to 95% as far as the prills are concerned, from 2 to 30% as far as the water is concerned, from 2 to 12% as far as the oily phase is concerned and from 0.2 to 5% as far as the emulsifying agent is concerned.

According to an advantageous embodiment of the abovesaid explosive emulsion water in oil, the latter comprises a gaseous phase.

The object of the presence in the emulsion of a gaseous phase is to render the emulsion sensitive, i.e. to increase its explosive qualities.

The said gaseous phase can be generated by incorporation of chemical products such as nitrates, which are decomposable in situ with release of gas.

It can also be obtained by incorporation into the emulsion of a porous matter, as for exemple the one which is denoted by the technician by the word "micro-balloons".

The emulsifying agents used for the oily phase can be selected from the group comprising alcohol alkoxylates, phenol alkoxylates, poly(oxyalkylene)glycols, esters of fatty acids, poly(oxyalkylenes), alkoxylates of amines, esters of fatty acids of sorbitol and of glycerol, the salts of fatty acids, the esters of sorbitan, the esters of poly(oxyethylene)sorbitan, the alkoxylates of fatty amines, the esters of poly(oxyalkylene)glycols, the amides of fatty acids, the alkoxylates of amides of fatty acids, the fatty amines, quaternary amines, the alkyloxazolines, the alcenyloxazolines, the imidazolines, the alkylsulphonates, the alkylarylsulphonates, the alkylsulphosuccinates, the alkylphosphates, the alcenylphosphates, the phosphoric esters, the lecithine, les copolymers of poly-(oxy-alkylene)glycols and of poly(12-hydroxystearic acid).

The derivatives of the poly(alkyl- or alcenyl)succinic anhydride with amines such as ethylenediamine, diethylenetriamine and ethanolamine are especially preferred.

Another use of the grains or prills according to the invention is the preparation of explosive compositions comprising the mixture of, on the one hand, an emulsion water in oil based on ammonium nitrate and, on the other hand, grains or prills according to the invention, advantageously after absorption of a fuel-oil.

The invention relates consequently also to explosive compositions comprising, on the one hand, an emulsion water in oil in which the aqueous phase is a solution of ammonium nitrate and, on the other hand, the prills or grains according to the invention the said explosive compositions comprising from 40 to 95% by weight of ammonium nitrate of which 10 to 90% are introduced by way of the said prills.

It is also possible to contemplate the presence in the said explosive compositions of solid or liquid supplemental fuels selected for example from the group comprising kerosene, waxes, paraffines and vegetable oils.

It is also possible to contemplate the presence, within the aqueous phase of the abovesaid emulsions, of salts selected for example, from the group comprising the nitrates and especially calcium nitrate, the chlorates and the perchlorates.

The invention may still be better understood with the means of the following examples which relate to advantageous embodiments of the invention without limiting the scope of thereof.

EXAMPLE 1

In a first test, there is incorporated in one ton of a molten solution of ammonium nitrate concentrated to 96% and whose temperature is 160° C., a proportion of 3 kg of an aqueous solution of internal additive according to the invention whose dry matter is 25%, which corresponds to 750 ppm of dry matter with respect to the ammonium nitrate, the said aqueous solution of internal additive consisting of 43.75% of water 25% of sodium isopropyl-benzenesulphonate having 50% of dry matter, 31.25% of a sodium salt of an acrylic polymeric acid whose molecular mass is 4500 having 40% of dry matter, the Brookfield viscosity of the said salt being 900 mPa.s at 100 r.p.m. and its density 1.29.

That solution of internal additive is denoted composition A.

The thus complemented ammonium nitrate of the composition A is prilled in order to obtain in the bottom of the prilling tower a residual humidity of 2% and a temperature of 90° C.

The thus obtained porous grains or prills of ammonium nitrate are then treated successively in a pre-drying device, a drying device and a cooling device before being subjected to an anticlumping treatment using 0.05% (i.e. 500 g per ton of ammonium nitrate) of anticlumping agent based on anionic surfactive agents according to French patent FR-A-2 629 815 marketed by the Applicants under the trademark GALORYL® ATH 626 M.

In a second test, an internal additive according to the prior art is used, i.e. a sodium methylnaphtalenesulphonate marketed under the trademark PETRO® AG by the Company WITCO/DE SOTO.

The amount of additive is 2 kg of solution having 50% dry matter per ton of ammonium nitrate.

In Table I are given the features of the prill obtained in the two tests.

TABLE I

| Internal additive | Residual humidity % | Hardness of the grain kg | % absorption of fuel | Granulometric repartition In % | | | | |
|---|---|---|---|---|---|---|---|---|
| | | | | <2 | <2 >1.6 | <1.6 >1 | <1 >0.1 | <0.5 |
| Composition A | 0.08 | 0.30 | 11.7 | 9.4 | 22.5 | 63.1 | 4.8 | 0.2 |
| PETRO ® AG | 0.08 | 0.13 | 11.4 | 13.5 | 24.5 | 54.7 | 6.8 | 0.5 |

The features collected in Table I show that the internal additive according to the invention having a residual humidity of 0.08%, permits the obtention of a prill which is harder (0.3 kg) than the internal additive according to the prior art (0.13 kg), the granulometric fraction being narrower in the case of the prill obtained with the internal additive according to the invention.

EXAMPLE 2

Illustration of the Synergy Obtained using Simultaneously the Constituents of the Internal Additive according to the Invention Three tests were performed using prills respectively prepared
- using the internal additive according to the invention consisting of composition A,
- with the same quantity of one of the constituents of composition A denoted A1,
- with the same quantity of the other of the constituents of composition A denoted A2.

In order to carry out these tests, there are introduced into a molten solution of ammonium nitrate concentrated to 96% by weight of dry matter and whose temperature is 160° C.,
- in the first test, 3 kg of a solution having 25% of dry matter of composition A per ton of the molten solution of ammonium nitrate, i.e. 750 ppm of dry matter with respect to the ammonium nitrate (or 375 ppm of dry matter of sodium isopropyl benzenesulphonate or A1 and 375 ppm of dry matter of sodium salt of a polycarboxylic acid whose molecular weight is equal to 4500 or A2),
- in the second test, 3 kg of a solution having 25% of dry matter of A1 per ton of the molten solution of ammonium nitrate (i.e. 750 ppm of dry matter of A1),
- in the third test, 3 kg of solution having 25% of dry matter of A2 per ton of the molten solution of ammonium nitrate (i.e. 750 ppm of dry matter of A2).

The three types of prills are manufactured starting from the abovesaid three mixtures and their residual humidity, their hardness (expressed in kg), and the percentage of fuel which they are capable to absorb are measured.

Said results are collected in Table II.

TABLE II

| | Characteristic features of the prill | | |
|---|---|---|---|
| Additive | Residual humidity (%) | Hardness (kg) | Absorption of the fuel (%) |
| A1 | 0.08 | 0.17 | 11.9 |
| Composition A | 0.08 | 0.3 | 11.7 |
| A2 | 0.08 | 0.2 | 5 |

The results collected in Table II show clearly the synergistic effect.

EXAMPLE 3

Examination of the Influence of the Internal Additive according to the Invention on the Stability of the Emulsions Water in Oil Based on Ammonium Nitrate Explosive emulsions water in oil based on ammonium nitrate are prepared.

In order to prepare the aqueous phase, ammonium nitrate is dissolved in water at a temperature of 80°–85° C.

In order to prepare the oily phase, emulsifying agents are mixed with a mineral oil of low viscosity at a temperature of 80° C.

In a mixing device of the type HOBART, model N 50 G, previously heated to 80° C., is poured under stirring (speed 2) the aqueous phase at 80° C. in the oily phase containing the emulsifying agents. The operation takes 2 minutes. The stirring is then maintained during two minutes.

The centesimal composition of the emulsion thus obtained is as follows:

| | |
|---|---|
| ammonium nitrate | 63.4% |
| water | 29.3% |
| mineral oil of low viscosity | 5.5% |
| soya lecithin | 0.9% |
| sorbitan monooleate | 0.9% |
| | 100 |

The thus prepared emulsion is stored in stopped flasks which are maintained in a ventilated oven at the constant temperature of 50° C.

Every day the emulsion is observed and the separation into two phases is noted.

In order to show the qualities of the internal additive according to the invention, three tests were carried out along the preceding protocol.

In a first test, composition A was used as internal additive.

In a second test, there was used, as internal additive, the one which is marketed by the Applicants under the trademark GALORYL® AT 725 which is based on sodium naphthalenesulphonate.

In a third test, there was used, as internal additive, the one which is marketed by Company WITCO/DE SOTO under the trademark PETRO AG® which is based on sodium methylnaphthalenesulphonate.

The quantities used in the three tests are the same (they represent 500 ppm with respect to the ammonium nitrate).

The stability as measured was equal to
- 30 days in the case of composition A,
- 15 days in the case of PETRO® AG,
- 1 day in the case of GALORYL® AT 725, which perfectly shows the superiority of the internal additive according to the invention.

EXAMPLE 4

Examination of the Influence of the Internal Additive according to the Invention compared with the Influence of Internal Additives according to the Prior Art on the Stability of an Explosive Emulsion Water in Oil Based on Ammonium Nitrate and Subjected to Heating Cycles.

Explosive emulsions water in oil based on ammonium nitrate were prepared.

The aqueous phase is prepared by dissolving ammonium nitrate in water at 90° C.

The oily phase is a mineral oil of low viscosity and it is heated to 90° C.; the emulsifying agent (PiBSA) is introduced in the oily phase at 90° C.

The oily phase is introduced in a mixing device of the type HOBART, model N 50 G, previously heated to 90° C. The aqueous phase is then poured at 90° C. within 1 min 30 under stirring (speed 3) in the oily phase, the stirring being maintained during 2 minutes.

The centesimal composition of the emulsion thus obtained is as follows:

| | |
|---|---|
| ammonium nitrate | 75.5% |
| water | 15.5% |
| mineral oil of low viscosity | 8% |
| emulsifying agent of the type PiBSA | 1% |
| (amine salt of a derivative of polyisobutylene succinic anhydride) | |
| | 100 |

Nine tests were performed in each of which there is introduced into the emulsion an internal additive (of the type of those used for the manufacture of the prills) and possibly a so-called external additive which actually is a coating agent (of the type of those which are used for the anticlumping treatment of the prills).

The nature and the amount of internal and of external additive are indicated for each of the nine tests in the following Table III.

TABLE III

| Test No. | Nature and proportion of the internal additive (in dry matter) | Nature and proportion of the external additive |
|---|---|---|
| 1 | Composition A 500 ppm | 0 |
| 2 | Composition A 500 ppm | GALORYL ® ATH 626 M 800 ppm |
| 3 | Composition A 500 ppm | LILAMIN ® AC 59 L 800 ppm |
| 4 | Composition A 500 ppm | GALORYL ® AT 4045 800 ppm |
| 5 | Composition A 500 ppm | Talc 2500 ppm GALORYL ® AT 4045 800 ppm |
| 6 | GALORYL ® AT 725 500 ppm | 0 |
| 7 | GALORYL ® AT 725 500 ppm | GALORYL ® ATH 626 M 800 ppm |
| 8 | PETRO ® AG 500 ppm | 0 |
| 9 | PETRO ® AG 500 ppm | GALORYL ® ATH 626 M 800 ppm |

It is possible to introduce in the thus constituted nine emulsions density reducing agents such as microspheres and especially prills of ammonium nitrate according to the invention containing an internal additive according to the invention, the said prills having previously absorbed a certain amount of fuel-oil.

The thus obtained mixture of an emulsion water in oil of the type in question and of prills according to the invention are called "heavy ANFO".

If prills according to the prior art were mixed with the emulsions water in oil in order to constitute explosives of the type "heavy ANFO", the internal and external additives of the said prills have a destabilizing action on the "heavy ANFO".

This destabilization induces hardening of the emulsion due to the crystallization of the ammonium nitrate.

The said hardening is noticed with respect to the above-said emulsions which comprise the internal additives according to the prior art.

It is measured using a cone-penetrometer according to the standard NF T 60119. The result is expressed in tenth of millimeters, the average value of three determinations is used. The values are comprised between 0 and 380 tenth of millimeters. The higher the obtained value is, the less the emulsion is hard, in other words the more stable it is, the nitrate not having crystallized or only in a low extent.

In the case that the crystallization is too important, the emulsion becomes too hard to authorize a measurement (in other words it is solid). The emulsion is subjected to successive heating periods at 43° C. during 24 hours. A complete cycle is equal to 48 hours. The measurements with the penetrometer are carried out at 25° C. after 1, 2, 3, 4 and 5 heating cycles.

The results of these measurements are collected in Table IV.

TABLE IV

| | Hardness (in mm) after 1 to 5 cycles with the emulsions | | | | | | | | |
|---|---|---|---|---|---|---|---|---|---|
| | 1 | 2 | 3 | 4 | 5 | 6 | 7 | 8 | 9 |
| 1 | 382 | 380 | 380 | 333 | 348 | 335 | 329 | 385 | 380 |
| 2 | 382 | 340 | 290 | 234 | 280 | solid | solid | 380 | 360 |
| 3 | 340 | 320 | 190 | 133 | 120 | | | 345 | 330 |
| 4 | 300 | 270 | solid | solid | solid | | | 220 | 190 |
| 5 | 190 | solid | | | | | | solid | solid |

The examination of these results show an excellent behaviour of the internal additives according to the invention.

Especially, the collected results permit the following conclusions:

the prills containing, as internal additive, naphthalenesulphonate such as GALORYL® AT 725, fragilize the emulsions (emulsions 6 and 7);

the novel internal additives according to the invention improve the stability of the emulsions water in oil; more generally it is noticed that the prills of ammonium nitrate containing the internal additive according to the invention, can be coated using the majority of the organic coating agents in aqueous or in oily solutions, the emulsion having a sufficient stability.

As far as the external additives are concerned, the above-said results show that:

the use, as anticlumping agents, of organic oily coating agents such as organic salts of amines, salts of alkylarylsulphonates, metallic salts and the salts of amines of alkylphosphates or the mixtures of these compounds, enable to improve the stability of the emulsions with respect to the coatings based on surfactive agents in aqueous solution among which the most used are the alkylarylsulphonates (emulsions 2, 3, 4 and 5);

the use as anticlumping agents of mineral coating agents possibly combined, have a negative effect on the stability of the emulsions;

The oily coatings present a clear superiority on the point of view of the anticlumping properties, of the anti-dust properties and of the resistance to humidity; and the anticlumping agents commercialized by the Applicants under the trademark GALORYL® ATH 626 M and GALORYL® ATH 525 P are to be mentioned in particular.

Two supplemental tests were performed proceeding as above, except the difference according to which the proportions of internal additive and of anticlumping agent are different.

The two emulsions water in oil corresponding to these two tests comprise proportions of internal additive and of anticlumping agent which are indicated in table V.

TABLE V

| Test No. | Nature and proportion of the internal additive (in dry matter) | Nature and proportion of the external additive |
|---|---|---|
| 10 | Composition A 750 ppm | GALORYL ATH 626 M 800 ppm |
| 11 | PETRO AG 750 ppm | GALORYL ATH 626 M 800 ppm |

The hardening is measured after 1, 2, 3, 4 and 5 heating cycles.
The results (in mm) are collected in Table VI.

TABLE VI

| Cycle | 10 | 11 |
|---|---|---|
| 1 | 380 | 380 |
| 2 | 380 | 240 |
| 3 | 340 | solid |
| 4 | 260 | |
| 5 | solid | |

The result recorded in the case of test 10 shows the decisive advantage due to the use of an internal additive according to the invention; on the contrary, the increase of the content in naphthalenesulphonate in test 11 leads to a very clear decrease of the stability of the emulsion.

Consequently, the prills of ammonium nitrate which correspond to test 10 constitute an industrial product which presents all the qualities requested for a commercial product.

In that connection, it has been noted that the said product presents an excellent porosity and hardness, excellent anticlumping properties, excellent anti-dust properties and excellent properties against uptake of humidity, and that it provides the compositions of the "heavy ANFO" type with a very good stability, being recalled that it is intended to the manufacture of the said "heavy ANFO".

EXAMPLE 5

Illustration of the Synergistic Effect Obtained when using Simultaneously the Components of the Internal Additive according to the Invention The following compositions were prepared:

a) Composition A3 comprising:
   25% by weight of PETRO® AG (see example 1),
   31.25% by weight of a sodium salt of a polymeric acrylic acid whose molecular mass is 4500 and which comprises 40% of dry matter, the Brookfield viscosity of this salt being 900 mPa.s at 100 r.p.m. and its density is 1.29; this product is denoted A2 in example 2;
   43.75% by weight of water, b) Composition A4 comprising:
   a condensate of sodium β-naphthalene sulphonate with formaldehyde; the statistic molar ratio formol/β-naphthalene is 0.8; this product is in the form of an aqueous solution comprising 50% of dry matter;

c) Composition A5 comprising:
   25% by weight of composition A4
   31.25% by weight of composition A2
   43.75% by weight of water.

Four tests were carried out using successively the prills prepared:

using the internal additive according to the invention consisting of composition A3, using the internal additive according to the invention consisting of composition A5, using the internal additive consisting of PETRO® AG, using the internal additive consisting of composition A4.

For the preparation of the said prills, there is introduced into a melted concentrated solution of ammonium nitrate having 96% by weight of dry matter and whose temperature is 160° C., 3 kg of a 25% solution of composition A3 in the first test and of composition A5 in the second test per ton of melted solution of ammonium nitrate, i.e. 750 ppm of dry matter of A3 or A5, 1.5 g of a 50% solution of PETRO® AG in the third test and of composition A4 in the fourth test per ton of melted solution of ammonium nitrate, i.e. 750 ppm of dry matter of PETRO® AG or A4.

The prills are prepared starting from these four compositions and, in the same way as examples 1 and 2, their residual humidity, their hardness (expressed in kg) and the percentage of fuel which they are capable to absorb are determined.

The results of these determinations are collected in Table VII.

TABLE VII

| | Characteristic features of the prills | | |
|---|---|---|---|
| Additive | Residual humidity (%) | Hardness (kg) | Absorption of fuel (%) |
| A3 | 0.08 | 0.30 | 11.2 |
| A5 | 0.08 | 0.30 | 10.1 |
| PETRO ® AG | 0.08 | 0.13 | 11.4 |
| A4 | 0.08 | 0.20 | 10.5 |

The data collected in Table VII clearly show a synergy especially from the standpoint of hardness of the prill.

We claim:

1. Process for manufacturing prills of ammonium nitrate, comprising, a) selecting on the one hand a melted solution of ammonium nitrate and on the other hand a proportion with respect to the dry matter of the ammonium nitrate from 0.005 to 0.12% by weight in dry matter of an internal additive consisting of an aqueous solution containing at least one salt of sulphonic acid selected from the group consisting of the salts of alkylbenzene sulphonic acids selected from the group consisting of the salts of alkaline metals, the ammonium salts, the amine or alkanolamine salts of linear or branched mono- and polyalkyl acids, the alkyl portion of which comprises from 1 to 12 carbon atoms, the salts of alkylnaphthalene sulphonic acids selected from the group consisting of the salts of alkaline metals, the ammonium salts, the amine or alkanolamine salts of linear or branched mono- and polyalkyl acids, the alkyl portion of which comprises from 1 to 12 carbon atoms, the salts of aryl- or alkylaryl-sulphonic acids polymerized with formaldehyde, the said salts being alkaline metal salts, ammonium salts, amine or alkanol-amine salts, aryl being benzene or naphthalene, alkyl being a linear or branched radical having from 1 to 12 carbon atoms, and at least one salt of polycarboxylic acid selected from the group consisting of the alkaline metal salts, the ammonium salts, the amine or alkanolamine salts of homopolymers and/or of copolymers of ethylene carboxylic acids which result from the polymerization of ethylenic acids of the group consisting of acrylic acid, methacrylic acid, fumaric acid, maleic acid, itaconic acid, crotonic acid, aconitic acid, sinapic acid, mesaconic acid, undecylenic acid, angelic acid, hydroxy-acrylic acid and maleic anhydride;

b) forming an intimate mixture of the melted solution of ammonium nitrate and of the internal additive and c) transforming the thus obtained intimate mixture in grains or prills.

2. Process according to claim 1, wherein the melted solution of ammonium nitrate has a dry matter content from 94 to 99% by weight.

3. Process according to claim 1, wherein the melted solution of ammonium nitrate has a temperature from 140° to 170° C.

4. Process according to claim 1, wherein the temperature of the melted solution is 160° C.

5. Process according to claim 1, wherein the internal additive is consisting of an aqueous solution containing from 10 to 90% by weight expressed in dry matter of the at least one salt of sulphonic acid and from 90 to 10% by weight expressed in dry matter of the at least one salt of polycarboxylic acid.

6. Process according to claim 1, wherein the transformation into prills or grains is performed using a prilling tower or a granulating drum.

7. Process for manufacturing prills of ammonium nitrate, comprising, a) selecting on the one hand a melted solution of ammonium nitrate having a dry matter content from 94 to 99% by weight and a temperature from 140° to 170° C. and on the other hand a proportion with respect to the dry matter of the ammonium nitrate from 0.005 to 0.12% by weight in dry matter of an internal additive consisting of an aqueous solution containing from 10 to 90% by weight expressed in dry matter of at least one salt of sulphonic acid selected from the group consisting of the salts of alkylbenzene sulphonic acids selected from the group consisting of the salts of alkaline metals, the ammonium salts, the amine or alkanolamine salts of linear or branched mono- and polyalkyl acids, the alkyl portion of which comprises from 1 to 12 carbon atoms, the salts of alkylnaphthalene sulphonic acids selected from the group consisting of the salts of alkaline metals, the ammonium salts, the amine or alkanolamine salts of linear or branched mono- and polyalkyl acids, the alkyl portion of which comprises from 1 to 12 carbon atoms, the salts of aryl- or alkylaryl-sulphonic acids polymerized with formaldehyde, the said salts being alkaline metal salts, ammonium salts, amine or alkanol-amine salts, aryl being benzene or naphthalene, alkyl being a linear or branched radical having from 1 to 12 carbon atoms, and from 90 to 10% by weight expressed in dry matter of at least one salt of polycarboxylic acid selected from the group consisting of the alkaline metal salts, the ammonium salts, the amine or alkanolamine salts of homopolymers and/or of copolymers of ethylene carboxylic acids which result from the polymerization of ethylenic acids of the group consisting of acrylic acid, methacrylic acid, fumaric acid, maleic acid, itaconic acid, crotonic acid, aconitic acid, sinapic acid, mesaconic acid, undecylenic acid, angelic acid, hydroxy-acrylic acid and maleic anhydride;

b) forming an intimate mixture of the melted solution of ammonium nitrate and of the internal additive and c) transforming the thus obtained intimate mixture in grains or prills using a prilling tower or a granulating drum.

8. Process according to claim 1, wherein the proportion of the internal additive with respect to the dry matter of the ammonium nitrate is from 0.01 to 0.08% by weight in dry matter of said additive.

9. Process according to claim 1, wherein the proportion of the internal additive with respect to the dry matter of the ammonium nitrate is from 0.03 to 0.08% by weight in dry matter of said additive.

10. Process according to claim 1, wherein the at least one salt of sulphonic acid is selected from the group consisting of the salts of alkylbenzene sulphonic acids selected from those of the group consisting of toluene sulphonic acid, xylene sulphonic acid, trimethylbenzene sulphonic acid, butylbenzene sulphonic acid and dodecylbenzene sulphonic acid, the salts of alkylnaphthalene sulphonic acids selected from those of the group consisting of sulphonic acid, methyl-, dimethyl, isopropyl-, diisopropyl-, butyl- or dibutyl-naphthalene sulphonic acid, $\alpha$- or $\beta$-naphthalene sulphonic acid, the salts of aryl- or alkylaryl-sulphonic acids polymerized with formaldehyde selected from those of the group consisting of $\alpha$- or $\beta$-naphthalene sulphonic acid and methyl- or dimethyl-naphthalene sulphonic acid polycondensated with formaldehyde.

11. Process according to claim 1, wherein the polycarboxylic acid has a molecular weight from 500 to 15000.

12. Process according to claim 1, wherein the internal additive comprises from 20 to 80% by weight expressed in dry matter of the at least one salt of sulphonic acid and from 80 to 20% by weight expressed in dry matter of the at least one salt of polycarboxylic acid.

13. Process according to claim 1, wherein the internal additive comprises from 30 to 70% by weight expressed in dry matter of the at least one salt of sulphonic acid and from 70 to 30% by weight expressed in dry matter of the at least one salt of polycarboxylic acid.

14. Process according to claim 1, wherein the concentration in dry matter of the internal additive is from 20 to 50% by weight.

* * * * *